(12) United States Patent
Brown et al.

(10) Patent No.: US 7,517,824 B2
(45) Date of Patent: Apr. 14, 2009

(54) PROCESS FOR STEAM STRIPPING HYDROCARBONS FROM A BROMINE INDEX REDUCTION CATALYST

(75) Inventors: Stephen H. Brown, Bernardsville, NJ (US); Khavinet Lourvanij, Houston, TX (US)

(73) Assignee: ExxonMobil Chemical Company, Houston, TX (US)

( * ) Notice: Subject to any disclaimer, the term of this patent is extended or adjusted under 35 U.S.C. 154(b) by 493 days.

(21) Appl. No.: 11/295,191

(22) Filed: Dec. 6, 2005

(65) Prior Publication Data

US 2007/0129235 A1   Jun. 7, 2007

(51) Int. Cl.
  *B01J 38/06* (2006.01)
  *B01J 29/06* (2006.01)
(52) U.S. Cl. .......................................... 502/55; 502/68
(58) Field of Classification Search .................... 502/55, 502/68
  See application file for complete search history.

(56) References Cited

U.S. PATENT DOCUMENTS

| | | | |
|---|---|---|---|
| 2,778,863 A | 1/1957 | Maisel et al. | |
| 3,400,169 A | 9/1968 | Eng et al. | |
| 3,674,679 A * | 7/1972 | Washimi et al. | 208/48 Q |
| 3,761,389 A | 9/1973 | Rollman | |
| 3,835,037 A | 9/1974 | Fairweather et al. | |
| 3,888,939 A | 6/1975 | Rosback | |
| 4,046,869 A * | 9/1977 | Dorawala et al. | 423/652 |
| 4,053,367 A | 10/1977 | Gewartowski | |
| 4,089,798 A | 5/1978 | Sugiyama et al. | |
| 4,211,886 A | 7/1980 | Tabak et al. | |
| 4,309,281 A | 1/1982 | Dessau | |
| 4,401,554 A | 8/1983 | Choi et al. | |
| 4,439,409 A | 3/1984 | Puppe et al. | |
| 4,464,250 A * | 8/1984 | Myers et al. | 208/120.35 |
| 4,501,652 A | 2/1985 | Le et al. | |
| 4,665,256 A | 5/1987 | Dianis et al. | |
| 4,727,209 A | 2/1988 | Chao | |
| 4,774,379 A | 9/1988 | Butler et al. | |
| 4,795,550 A | 1/1989 | Sachtler et al. | |
| 4,826,667 A | 5/1989 | Zones et al. | |
| 4,849,570 A | 7/1989 | Bakas et al. | |
| 4,891,458 A | 1/1990 | Innes et al. | |
| 4,954,325 A | 9/1990 | Rubin et al. | |
| 4,992,606 A | 2/1991 | Kushnerick et al. | |
| 5,019,670 A | 5/1991 | Le et al. | |
| 5,081,323 A | 1/1992 | Innes et al. | |
| 5,105,039 A | 4/1992 | Pelrine | |
| 5,118,896 A | 6/1992 | Steigelmann et al. | |
| 5,132,477 A | 7/1992 | Ho et al. | |
| 5,146,026 A | 9/1992 | Berna Tejero et al. | |
| 5,149,894 A | 9/1992 | Holtermann et al. | |
| 5,157,158 A | 10/1992 | Berna Tejero et al. | |
| 5,229,341 A | 7/1993 | Kresge et al. | |
| 5,236,575 A | 8/1993 | Bennett et al. | |
| 5,296,428 A | 3/1994 | Degnan et al. | |
| 5,330,946 A | 7/1994 | Hynes et al. | |
| 5,347,061 A | 9/1994 | Harandi et al. | |
| 5,362,697 A | 11/1994 | Fung et al. | |
| 5,414,172 A | 5/1995 | Chin et al. | |
| 5,417,844 A | 5/1995 | Boitiaux et al. | |
| 5,470,810 A | 11/1995 | Degnan et al. | |
| 5,536,894 A | 7/1996 | Degnan et al. | |
| 5,545,788 A | 8/1996 | Cheng et al. | |
| 5,683,573 A | 11/1997 | Haizmann et al. | |
| 5,689,027 A | 11/1997 | Abichandani et al. | |
| 5,792,338 A | 8/1998 | Gosling et al. | |
| 5,865,986 A | 2/1999 | Buchanan et al. | |
| 5,865,988 A | 2/1999 | Collins et al. | |
| 5,877,370 A | 3/1999 | Gajda | |
| 5,955,641 A | 9/1999 | Chen et al. | |
| 6,005,154 A | 12/1999 | Zones et al. | |
| 6,031,114 A | 2/2000 | DeVries et al. | |
| 6,031,144 A | 2/2000 | Campbell et al. | |
| 6,080,382 A | 6/2000 | Lee et al. | |
| 6,096,935 A | 8/2000 | Schulz et al. | |
| 6,103,215 A | 8/2000 | Zones et al. | |
| 6,111,158 A | 8/2000 | Marinangeli et al. | |
| 6,133,497 A | 10/2000 | Hähn et al. | |
| 6,323,381 B1 | 11/2001 | Nacamuli et al. | |

(Continued)

FOREIGN PATENT DOCUMENTS

AU   9856403 A   9/1999

(Continued)

OTHER PUBLICATIONS

U.S. Appl. No. 11/140,182, filed May 27, 2005, Brown et al.

(Continued)

*Primary Examiner*—Timothy C Vanoy
*Assistant Examiner*—Daniel Berns
(74) *Attorney, Agent, or Firm*—Andrew B. Griffis

(57) ABSTRACT

The present invention relates to a process for stripping hydrocarbons from a catalyst, comprising the step of contacting the catalyst with steam at stripping conditions, wherein the catalyst comprises a molecular sieve having a structure type of MWW, the steam comprises at least 90 wt. % vapor phase $H_2O$, the stripping conditions comprise a temperature range from about 100° C. to about 250° C., a pressure less than 310 kpa-a, and a WHSV range from about 0.01 to about 100 $hr^{-1}$.

9 Claims, No Drawings

U.S. PATENT DOCUMENTS

| | | |
|---|---|---|
| 6,368,496 B1 | 4/2002 | Brown et al. |
| 6,500,996 B1 | 12/2002 | Brown et al. |
| 6,613,950 B1 * | 9/2003 | Vaughn et al. .............. 585/639 |
| 6,781,023 B2 | 8/2004 | Brown et al. |
| 2003/0176752 A1 * | 9/2003 | Levin et al. ................. 585/640 |
| 2004/0192993 A1 * | 9/2004 | Lattner et al. ............... 585/639 |

FOREIGN PATENT DOCUMENTS

| | | |
|---|---|---|
| CS | 252248 B1 | 8/1987 |
| EP | 0 032 414 | 7/1981 |
| EP | 0 382 960 | 8/1990 |
| EP | 0 231 860 | 9/1993 |
| EP | 0 780 458 | 6/1997 |
| EP | 0 704 416 | 1/2000 |
| EP | 0 776 876 | 6/2000 |
| EP | 0 748 305 | 8/2000 |
| EP | 0 952 962 | 10/2001 |
| EP | 0 895 976 | 10/2003 |
| GB | 2279661 | 1/1994 |
| JP | 4198139 A | 7/1992 |
| JP | 4253925 A | 9/1992 |
| WO | WO 93/03116 | 2/1993 |
| WO | WO 99/38936 | 8/1999 |

OTHER PUBLICATIONS

U.S. Appl. No. 11/281,675, filed Nov. 17, 2005, Brown et al.
U.S. Appl. No. 11/282,002, filed Nov. 17, 2005, Brown et al.
"Handbook of Petroleum Processing", McGraw-Hill, New York 1996, pp. 4.3-4.26.

* cited by examiner

PROCESS FOR STEAM STRIPPING HYDROCARBONS FROM A BROMINE INDEX REDUCTION CATALYST

FIELD

The present invention relates to a process for stripping hydrocarbons from a catalyst. In particular, the present invention relates to a process for stripping hydrocarbons from a catalyst used for Bromine Index (BI) reduction by contacting the catalyst with steam.

BACKGROUND OF INVENTION

Hydrocarbon feedstocks such as aromatic hydrocarbon feedstocks are derived from processes such as naphtha reforming and thermal cracking (pyrolysis). Such feedstocks can be used in a variety of petrochemical processes, such as para-xylene production from an aromatic hydrocarbon feedstock containing benzene, toluene and xylene (BTX), toluene disproportionation, xylene isomerization, alkylation and transalkylation. However, aromatic hydrocarbon feedstocks often contain contaminants comprising bromine-reactive compounds including unsaturated hydrocarbons, such as mono-olefins, multi-olefins and styrenes. These can cause undesirable side reactions in downstream processes. Therefore, these contaminants should be removed from the aromatic hydrocarbon feedstocks before they can be used in other processes.

Improved processes for aromatics production, such as that described in the Handbook of Petroleum Processing, McGraw-Hill, New York 1996, pp. 4.3-4.26, provide increased aromatics yield but also increase the amount of contaminants. For example, the shift from high-pressure semi-regenerative reformers to low-pressure moving bed reformers results in a substantial increase in BI in the reformate streams, which are aromatic hydrocarbon feedstocks for downstream processes. This results in a greater need for more efficient and less expensive methods for removal of hydrocarbon contaminants from aromatic hydrocarbon feedstocks, e.g., reformate streams.

Olefins (mono-olefins and multi-olefins) in aromatic hydrocarbon feedstocks are commercially removed by hydrotreating processes. Commercial hydrotreating catalysts have proved active and stable to substantially convert multi-olefins contained therein to oligomers and to partially convert the olefins to alkylaromatics.

The clay treatment of hydrocarbons is widely practiced in the petroleum and petrochemical industries. Clay catalysts are used to remove impurities from hydrocarbon feedstocks in a wide variety of processes. One of the most common reasons for treating these hydrocarbon feedstocks with a clay catalyst system is to remove undesirable olefins, including both multi-olefins and mono-olefins, in order to meet various quality specifications.

More recently, molecular sieves, and particularly zeolites, have been proposed as replacements for clays in the removal of olefinic compounds from aromatic hydrocarbon feedstocks. U.S. Pat. No. 6,368,496 (Brown et al.) discloses a method for removing bromine reactive hydrocarbon contaminants from aromatic streams by first providing an aromatic feedstream having a negligible diene level. The feedstream is contacted with an acid active catalyst composition under conditions sufficient to remove mono-olefins. An aromatic stream may be pretreated to remove dienes by contacting the stream with clay, hydrogenation or hydrotreating catalyst under conditions sufficient to substantially remove dienes but not mono-olefins.

U.S. Pat. No. 6,500,996 (Brown et al.) discloses a method for the removal of hydrocarbon contaminants, such as dienes and olefins, from an aromatics reformate by contacting an aromatics reformate stream with a hydrotreating catalyst and/or a molecular sieve. The hydrotreating catalyst substantially converts all dienes to oligomers and partially converts olefins to alkylaromatics. The molecular sieve converts the olefins to alkylaromatics. The process provides an olefin depleted product which can be passed through a clay treater to substantially convert the remaining olefins to alkylaromatics. The hydrotreating catalyst has a metal component of nickel, cobalt, chromium, vanadium, molybdenum, tungsten, nickel-molybdenum, cobalt-nickel-molybdenum, nickel-tungsten, cobalt-molybdenum or nickel-tungsten-titanium, with a nickel molybdenum/alumina catalyst being preferred. The molecular sieve is an intermediate pore size zeolite, preferably MCM-22. The clay treatment can be carried out with any clay suitable for treating hydrocarbons.

The molecular sieve catalyst has limited lifetimes in hydrocarbon feedstock treatment services partially due to the deposition of hydrocarbons onto the catalyst. The length of service correlates with the amount and the kind of olefinic compounds in the hydrocarbon feedstocks. In general, the molecular sieve catalyst needs to be regenerated after being in hydrocarbon feedstock treatment services for a period of time. The molecular sieve catalyst may be regenerated by burning off the hydrocarbons under oxidative environment, stripping off at least a portion of the hydrocarbons with He, $N_2$, $H_2$, light hydrocarbons, or steam before burning off the remaining hydrocarbons deposition on the catalysts. However, steaming the molecular sieve catalyst under severe conditions may cause irreparable damage to the catalytic activity of the molecular sieve catalyst.

A need exists for an improved process for steaming the molecular sieve catalyst used in the BI reduction. The present invention provides a process for stripping hydrocarbons from a catalyst containing a molecular sieve having a structure type of MWW using steam under steaming conditions such that to regenerate at least a portion of its catalytic activity for the BI reduction application.

SUMMARY OF THE INVENTION

In one embodiment, the present invention relates to a process for stripping hydrocarbons from a catalyst, comprising the step of:

(a) contacting the catalyst with steam at stripping conditions, wherein the catalyst comprises a molecular sieve having a structure type of MWW, the steam comprises at least 90 wt. % vapor phase $H_2O$, the stripping conditions comprise a temperature range from about 100° C. to about 250° C., a pressure less than 310 kpa-a, and a WHSV range from about 0.01 to about 100 $hr^{-1}$.

In another embodiment of the present invention, a process for stripping hydrocarbons from a catalyst, comprising the steps of:

(a) contacting the catalyst with steam at stripping conditions by (i) flowing the steam from the top to the bottom of the catalyst; and (ii) flowing the steam from the bottom to the top of the catalyst; and (b) regenerating the catalyst with an oxidative agent under regeneration conditions having a temperature range of about 30 to 900° C., a pressure range of about 10 to 20000 kPa-a, and a WHSV from about 0.1 hr$^{-1}$ to about 1000 hr$^{-1}$, wherein the catalyst comprises a molecular sieve having a structure type of MWW, the steam comprises at least 90 wt. % vapor phase H$_2$O, the stripping conditions comprise a temperature range from about 100° C. to about 250° C., and a pressure less than 310 kPa-a.

In a preferred embodiment, the process for reducing the Bromine Index of a hydrocarbon feedstock, comprising the step of contacting the hydrocarbon feedstock under conversion conditions with a catalyst manufactured according to the process of above paragraph, wherein the conversion conditions comprise a temperature range from about 38° C. to about 538° C., a pressure range from about 136 kpa-a to about 6996 kPa-a, and a WHSV from about 0.1 hr$^{-1}$ to about 200 hr$^{-1}$.

These and other facets of the present invention shall become apparent from the following detailed description, figure, and appended claims.

DETAILED DESCRIPTION OF THE INVENTION

Introduction

All patents, patent applications, test procedures, priority documents, articles, publications, manuals, and other documents cited herein are fully incorporated by reference to the extent such disclosure is not inconsistent with the present invention and for all jurisdictions in which such incorporation is permitted.

When numerical lower limits and numerical upper limits are listed herein, ranges from any lower limit to any upper limit are contemplated.

The term "on-oil" or "on-stream" as used herein means contacting the feedstock(s) with a catalyst in a reactor e.g., molecular sieve(s), clay(s) or any combination thereof, under conversion conditions. The term "on-oil time" used herein means the time when the catalyst in a reactor is in contact with the feedstock(s) under conversion conditions.

The term "cycle-length" as used herein means the total on-oil time of the clay treater or molecular sieve catalyst before clay/molecular sieve catalyst change-out, rejuvenation, or regeneration. The cycle-length is a function of the hydrocarbon feedstock composition and deactivation rate of the clay/molecular sieve catalyst. In general, high mono-olefinic and/or multi-olefinic compounds and low clay/molecular sieve bed capacity will have a short cycle-length.

The term "fresh molecular sieve" as used herein means a molecular sieve that has not been exposed for a substantial amount of time (such as 24 hours) to hydrocarbon feedstocks under conversion conditions. Examples of fresh molecular sieve are newly synthesized MCM-22 before or after calcination. The term "spent molecular sieve" used herein, means a non-fresh molecular sieve, i.e., a molecular sieve that has been exposed for a substantial amount of time (such as 24 hours) to hydrocarbon feedstocks under conversion conditions. Examples of spent molecular sieves are regenerated or rejuvenated MCM-22 after being exposed to a transalkylation feedstock under transalkylation conditions or an alkylation feedstock under alkylation conditions. Typically, a spent molecular sieve has lower catalytic activity than the corresponding fresh molecular sieve.

As used herein the term "olefinic compound" or "olefinic material" is intended to refer to both mono-olefins and multi-olefins. Olefinic compounds may be objectionable in aromatic hydrocarbons at even very low concentrations of less than a few weight parts per million (wppm) for some processes such as nitration of benzene. The term "mono-olefins" as used herein means olefinic compounds containing one carbon-carbon double bond per molecule. Examples of mono-olefins are ethylene, propylene, butenes, hexenes, styrene, and octenes. The term "multi-olefins" used herein means olefinic compounds containing at least two carbon-carbon double bonds per molecule. Examples of multi-olefins are butadienes, cyclopentadienes, and isoprenes.

A catalyst (fresh, regenerated, or any combination thereof) may be deactivated after contacting the catalyst with a hydrocarbon feedstock for a period of time under catalytic conversion conditions. While not wishing to be bound by theory, we believe that the catalyst deactivation is partially due to the deposition of coke or heavy hydrocarbons on to the catalyst. Removing the deposited hydrocarbons may recover at least a portion of the catalytic activity.

A deactivated catalyst may be partially regenerated under oxidative conditions, e.g., burning the deactivated catalyst with air to remove the hydrocarbons on the catalyst. However, the catalytic activity of catalyst regenerated in this manner is commonly a small portion of the activity of the fresh catalyst, e.g., less than 50%, partially due to the damage to the catalyst by the heat generated during the coke burning process. The regenerated catalyst normally has shorter cycle-length than that of the catalyst before regeneration.

A deactivated catalyst may be subjected to steaming process to strip off a portion of the deposition of coke or heavy hydrocarbons on the deactivated catalyst before regeneration under oxidative conditions. Such steaming process mitigates the damage to the catalyst by minimizing heat generated during the coke burning process. However, severe steaming may cause damage to the chemical structure of a catalyst. The present invention provides a process for stripping hydrocarbons from a catalyst containing a molecular sieve having a structure type of MWW using steam under steaming conditions so as to regenerate at least 60% of its catalytic activity for the BI reduction application.

Feed for BI Reduction

Hydrocarbon feedstocks such as aromatic streams can be obtained from reforming and cracking processes. The hydrocarbon feedstocks include, e.g., paraffins, aromatics, and bromine-reactive compounds such as olefins. For example, aromatic hydrocarbon feedstocks include mononuclear aromatic hydrocarbons and undesirable olefins including mono-olefins, multi-olefins, and styrene, which have an initial BI from about 100 to about 3000.

Because the exact nature of the unsaturated hydrocarbons may vary and may even be unknown, indirect methods of measuring the unsaturated hydrocarbons are typically used. One well-known method of measuring trace amounts of unsaturated hydrocarbons is the BI. The measurement of BI is described in detail in ASTM D2710-92, the entire contents of which are incorporated herein by reference. The BI indirectly measures the olefin content of aromatic containing hydrocarbon samples using potentiometric titration. Specifically, the BI is defined as the number of milligrams of bromine consumed by 100 grams of hydrocarbon sample under given conditions.

The aromatics include, for example, benzene, toluene, xylene, ethylbenzene, cumene and other aromatics derived, e.g., from reformate. Reformate is separated by distillation into light reformate (mostly benzene and toluene), and heavy reformate (including toluene, ortho-, meta- and para-xylenes and other heavier aromatics such as C$_9$+). Some aromatic streams such as heavy reformate derived from semi-regen processes contain multi-olefins as they emerge from the processing.

The amount of multi-olefins in a hydrocarbon feedstock may vary from less than 10 wt. % to less than 50 weight parts per million (wppm) depending on the source of feedstock and any pre-treatment.

The hydrocarbon feedstocks to be processed according to the invention contain bromine-reactive hydrocarbon compounds from about 0.001 to about 10 wt. %, preferably from about 0.001 to about 1.5 wt. %, more preferably from about 0.005 to about 1.5 wt. % or a BI from about 2 to about 20000, preferably from about 2 to about 3000, more preferably from about 10 to about 3000.

In one embodiment, the present invention has a hydrocarbon feedstock flowrate of at least 10 kg per day, preferably more than at least 100 kg per day, more preferably at least 200 kg per day.

Process Conditions for BI Reduction

The reaction for catalytically removing bromine-reactive compounds can be any reaction effectively reducing BI. Examples of these reactions are: polymerization of olefinic compounds, alkylation of paraffins and/or aromatics with olefinic compounds, and saturation and/or hydroxylation of the carbon-carbon double bonds of the olefinic compounds in the hydrocarbon feedstocks.

In accordance with the present invention, the above described hydrocarbon feedstocks may be contacted with a catalyst under suitable conversion conditions to remove multi-olefins and mono-olefins. Examples of these conversion conditions include a temperature of from about 38° C. to about 538° C., preferably 93° C. to about 371° C., more preferably 150° C. to about 270° C., to a pressure of from about 136 kPa-a to about 6996 kpa-a, preferably from about 205 kPa-a to about 5617 kpa-a, more preferably from about 205 kpa-a to about 3549 kPa-a, a weight hourly space velocity (WHSV) from about 0.1 $hr^{-1}$ and about 200 $hr^{-1}$, preferably from about 0.2 $hr^{-1}$ and about 100 $hr^{-1}$, more preferably from about 1 $hr^{-1}$ and about 50 $hr^{-1}$. The WHSV is based on the total weight of catalyst, i.e., the total weight of active catalyst plus any binder that is used.

Catalyst

Microporous particulate materials include crystalline molecular sieves. Molecular sieves are characterized by the fact that they are microporous particulate materials with pores of a well-defined size ranging discretely from about 2 Å to about 20 Å. Most organic molecules, whether in the gas, liquid, or solid phase, have dimensions that fall within this range at room temperature. Selecting a molecular sieve composition with a suitable and discrete pore size therefore allows separation of specific molecules from a mixture with other molecules of a different size through selective adsorption, hence the name "molecular sieve". Apart from the selective adsorption and selective separation of uncharged molecular sieve particles, the well-defined and discrete pore system of a molecular sieve enables selective ion exchange of charged particles and selective catalysis. In the latter two cases, significant properties other than the micropore structure include, for instance, ion exchange capacity, specific surface area and acidity.

A summary of existing technology, in terms of production, modification and characterization of molecular sieves, is described in the book "Molecular Sieves—Principles of Synthesis and Identification"; (R. Szostak, Blackie Academic & Professional, London, 1998, Second Edition). In addition to molecular sieves, amorphous materials, chiefly silica, aluminum silicate and aluminum oxide, have been used as catalyst supports. A number of long-known techniques, such as spray drying, prilling, pelletizing and extrusion, have been and are being used to produce macrostructures in the form of, for example, spherical particles, extrudates, pellets and tablets of both micropores and other types of porous materials for use in catalysis, adsorption and ion exchange. A summary of these techniques is described in "Catalyst Manufacture," A. B. Stiles and T. A. Koch, Marcel Dekker, New York, 1995.

Intergrown molecular sieve phases are disordered planar intergrowths of molecular sieve frameworks. These are generally described in the "Catalog of Disordered Zeolite Structures", 2000 Edition, published by the Structure Commission of the International Zeolite Association and to the "Collection of Simulated XRD Powder Patterns for Zeolites", M. M. J. Treacy and J. B. Higgins, 2001 Edition, published on behalf of the Structure Commission of the International Zeolite Association for a detailed explanation on intergrown molecular sieve phases.

Regular crystalline solids are periodically ordered in three dimensions. Structurally disordered structures show periodic ordering in dimensions less than three, i.e., in two, one or zero dimensions. This phenomenon is called stacking disorder of structurally invariant Periodic Building Units. Crystal structures built from Periodic Building Units are called end-member structures if periodic ordering is achieved in all three dimensions. Disordered structures are those where the stacking sequence of the Periodic Building Units deviates from periodic ordering up to statistic stacking sequences.

The catalyst used in this invention may be an intergrown molecular sieve phases having at least a portion of said intergrown molecular sieve phases comprising a zeolite structure type of MWW. Preferably at least 1 wt. %, more preferably at least 50 wt. %, even more preferably at least 95 wt. %, and most preferably at least 99 wt. % of the intergrown molecular sieve phases comprises a molecular sieve having a zeolite structure type of MWW.

Molecular sieves/zeolites useful in the present invention include any of the naturally occurring or synthetic crystalline molecular sieves. Examples of these zeolites include large pore zeolites, intermediate pore size zeolites, and small pore zeolites. These zeolites and their isotypes are described in "Atlas of Zeolite Structure Types", Eds. W. H. Meier, D. H. Olson and Ch. Baerlocher, Elsevier, Fourth Edition, 1996, the contents of which is hereby incorporated by reference. A large pore zeolite generally has a pore size of at least about 7 Å and includes LTL, VFI, MAZ, MEI, FAU, EMT, OFF, *BEA, MTW, MWW, and MOR structure type zeolites (IUPAC Commission of Zeolite Nomenclature). Examples of large pore zeolites include mazzite, offretite, zeolite L, VPI-5, zeolite Y, zeolite X, omega, Beta, ZSM-3, ZSM-4, ZSM-18, ZSM-20, SAPO-37, and MCM-22. An intermediate pore size zeolite generally has a pore size from about 5 Å to about 7 Å and includes, for example, MFI, MEL, MTW, EUO, MTT, MFS, AEL, AFO, HEU, FER, and TON structure type zeolites (IUPAC Commission of Zeolite Nomenclature). Examples of intermediate pore size zeolites include ZSM-5, ZSM-11, ZSM-12, ZSM-22, ZSM-23, ZSM-34, ZSM-35, ZSM-385, ZSM-48, ZSM-50, ZSM-57, silicalite 1, and silicalite 2. A small pore size zeolite has a pore size from about 3 Å to about 5.0 Å and includes, for example, CHA, ERI, KFI, LEV, SOD, and LTA structure type zeolites (IUPAC Commission of Zeolite Nomenclature). Examples of small pore zeolites include ZK-4, ZSM-2, SAPO-34, SAPO-35, ZK-14, SAPO-42, ZK-21, ZK-22, ZK-5, ZK-20, zeolite A, hydroxysodalite, erionite, chabazite, zeolite T, gmelinite, ALPO-17, and clinoptilolite.

The molecular sieve useful for this invention is usually a large pore size zeolite having a silica-to-alumina molar ratio of at least about 2, specifically from about 2 to 100. The silica to alumina ratio is determined by conventional analysis. This ratio is meant to represent, as closely as possible, the molar ratio in the framework of the molecular sieve and to exclude silicon and aluminum in the binder or in cationic or other form within the channels.

In one embodiment, the molecular sieves for selectively removing mono-olefinic and multi-olefinic compounds include a molecular sieve having a zeolite structure type of MWW, e.g., MCM-22 (U.S. Pat. No. 4,954,325), MCM-49 (U.S. Pat. No. 5,236,575), MCM-56 (U.S. Pat. No. 5,362,697), and ITQ-1 (U.S. Pat. No. 6,077,498). Preferred catalysts include at one of MCM-22, MCM-49, MCM-56, or ITQ-1. Most preferred are the MCM-22 family of molecular sieves, which includes MCM-22, MCM-49 and MCM-56. The MCM-22 type materials may be considered to contain a similar common layered structure unit. The structure unit is described in U.S. Pat. Nos. 5,371,310, 5,453,554, 5,493,065 and 5,557,024. Each of the patents in this paragraph describing molecular sieve materials is herein incorporated by reference. In a preferred embodiment, the catalyst of this invention comprises MCM-22, optionally further comprises a clay.

In another embodiment, other natural or synthetic crystalline molecular sieves, with ring structures of ten to twelve members or greater, may also be used together with the molecular sieve having a zeolite structure type of MWW. Crystalline molecular sieves useful as catalysts include as non-limiting examples, large pore zeolites ZSM-4 (omega) (U.S. Pat. No. 3,923,639), mordenite, ZSM-18 (U.S. Pat. No. 3,950,496), ZSM-20 (U.S. Pat. No. 3,972,983), zeolite Beta (U.S. Pat. Nos. 3,308,069 and Re 28,341), Faujasite X (U.S. Pat. No. 2,882,244), Faujasite Y (U.S. Pat. No. 3,130,007), USY (U.S. Pat. Nos. 3,293,192 and 3,449,070), REY and other forms of X and Y, and mesoporous materials such as M41 S (U.S. Pat. No. 5,102,643) and MCM-41 (U.S. Pat. No. 5,098,684). More preferred molecular sieves include 12 membered oxygen-ring structures ZSM-12, mordenite, Zeolite Beta, USY, layered materials, and mesoporous materials.

One measure of the acid activity of a zeolite is the Alpha Value. The Alpha Value is an approximate indication of the catalyst acid activity and it gives the relative rate constant (rate of normal hexane conversion per volume of catalyst per unit time). It is based on the activity of the highly active silica-alumina cracking catalyst taken as an Alpha of 1 (Rate Constant=0.16 sec$^{-1}$). The Alpha Value is described in U.S. Pat. No. 3,354,078, in the Journal of Catalysis, Vol. 4, p. 527 (1965); Vol. 6, p. 278, and Vol.; 61, p. 395 (1980), each of which is herein incorporated by reference as to that description. The experimental conditions of the test used include a constant temperature of 538° C., and a variable flow rate as described in the Journal of Catalysis, Vol. 61, p. 395 (1980).

In one embodiment, the molecular sieve(s) has an Alpha Value of at least 1, preferably at least 10, more preferably at least 100, more preferably at least 300.

The crystalline molecular sieve may be used in bound form, that is, composited with a matrix material, including synthetic and naturally occurring substances, such as clay, silica, alumina, zirconia, titania, silica-alumina and other metal oxides. Other porous matrix materials include silica-magnesia, silica-zirconia, silica-thoria, silica-beryllia, silica-titania, as well as ternary compositions such as silica-alumina-thoria, silica-alumina-zirconia, silica-alumina-magnesia, and silica-alumina-zirconia. The catalyst can be used in the form of an extrudate, lobed form (e.g. trilobe), or powder.

In one embodiment, the catalyst for this invention may include a molecular sieve having a zeolite structure type of MWW and a clay. The clay catalyst useful for this application is usually an acidic naturally-occurring clay or a synthetic clay material. Naturally-occurring clays include those of the montmorillonite and kaolin families. Clay catalyst system is used herein to refer to the passage of a hydrocarbon stream through a fixed bed of contact material, which possesses the capability of reacting olefinic compounds present in the hydrocarbon stream. Preferably the contact material is an acidic aluminosilicate. It may be either a naturally occurring material, such as bauxite or mordenite clay, or a synthetic material and may comprise alumina, silica, magnesia or zirconia or some other compound, which exhibits similar properties. A preferred clay is F-24 clay produced by Engelhard Corporation. However, several other types of clay are available commercially and are suitable for use in the present invention, including Filtrol 24, Filtrol 25 and Filtrol 62 produced by the Filtrol Corporation, Attapulgus clay and Tonsil clay. In a preferred embodiment, the clays are pretreated with concentrated HCl or $H_2SO_4$ acid.

In one embodiment, the catalyst for this invention comprises a molecular sieve having a zeolite structure type of MWW. In another embodiment, the catalyst for this invention may further include clay. The molecular sieve catalyst and clay catalyst may have a volume ratio of the molecular sieve catalyst over the clay catalyst range from about 1:99 to about 99:1, and preferably from 10:90 to about 90:10.

In one aspect of this invention, the catalyst may be located in a single reactor vessel. In another embodiment, the catalyst may be located in a reactor system comprising at least two reactor vessels connected in parallel, in series, or any combination thereof. Depending on the hydrocarbon feedstock and the operating conditions, two or more separate clay treater vessels can be used on an alternating (i.e., swing) basis to provide continuous operation. A clay reactor can also be used as the swing reactor for the molecular sieve bed when the molecular sieve is being replaced or regenerated.

In yet another embodiment, the molecular sieve catalyst and clay catalyst may also be packed in separate reactors. When the molecular sieve catalyst and clay catalyst are in separate reactors, each reactor may have different operating conditions. The molecular sieve catalytic and clay catalytic treating zones may be of any type and configuration that is effective in achieving the desired degree of BI reduction. It may utilize either upward or downward flow, with downward flow being preferred. The pressure in the molecular sieve and clay catalyst system zones should be sufficient to maintain at least 90 wt. % of the hydrocarbon feedstock in liquid phase conditions. This will normally be a pressure of about 136 kPa-a to about 13891 kPa-a. Preferably the pressure is set about 345 kPa higher than the vapor pressure of the hydrocarbons at the inlet temperature of the molecular sieve/clay zone. This temperature is preferably within the range of from about 130° C. to about 270° C. The molecular sieve and clay catalytic conversion may be performed over a broad range of weight hourly space velocities (WHSV). This variable is often set by the desired on-stream life of the molecular sieve and clay and may range from less than 0.5 hr$^{-1}$ to about 100 hr$^{-1}$, preferably from about 0.5 hr$^{-1}$ to about 10 hr$^{-1}$, more preferably from 1.0 hr$^{-1}$ to 4.0 hr$^{-1}$ depending on the hydrocarbon feedstock being treated.

Steaming Conditions

In one embodiment, the present invention provides a process of stripping a catalyst with steam at stripping conditions having a temperature range from about 100° C. to about 250° C., a pressure less than 310 kpa-a, and a WHSV range from about 0.01 to about 100 hr$^{-1}$.

The steam used in this invention comprises at least 90 wt. % vapor phase water, preferably at least 95 wt. %, more preferably at least 98 wt. %, and most preferably at least 99 wt. %. These skilled in the art will appreciate that steam can contain compounds other than $H_2O$, for example, He, $N_2$, and/or $O_2$. For the purpose of this application and the claims appended thereto, the "wt. % vapor phase water" is solely in reference to the $H_2O$ component of the steam, without considering any non $H_2O$ component.

Steaming and regenerating of molecular sieve catalysts may damage the molecular sieve structures. The steamed and/or regenerated molecular sieve catalyst may retain only a portion (such as 50%) of its initial activity. Steaming molecular sieves at lower temperatures minimizes the impact of steam on the molecular sieve structure. Lowering steaming temperature is generally associated with improved catalyst stability. Steam pressure is also known to influence the stability of the molecular sieve catalyst. Higher steam partial pressures are associated with decreased stability. Contacting time of steaming is also known to influence the stability of the molecular sieve catalyst. Longer contacting time is also associated with decreased stability.

We surprisingly discovered that the molecular sieve catalyst used in the BI reduction may be regenerated at least 80%, preferably at least 90%, even more preferably at least 95%, and most preferably at least 99% of its initial activity by steaming at a temperature range from about 100° C. to about 250° C., preferably from about 150° C. to about 250° C., more preferably from about 200° C. to about 250° C., and a pressure less than 310 kpa-a followed by regeneration under oxidative conditions.

The combination of the optimized temperature and pressure ranges, and optionally shorter contacting time yields improvement as demonstrated in the examples below. While not intended to be bound by theory, we believe that relative high temperature, low pressure, and optionally short contacting time may diminish damage to the molecular sieve structure relative to processes utilizing low temperature and high pressure.

In a preferred embodiment of this invention, the contacting time of steaming is less than 7 days, preferably less than 5 days, and more preferably less than 3 days.

In a preferred embodiment of this invention, the average pressure drop across the reactor in conducting steam stripping is below 689 kPa, preferably below 345 kPa, even more preferably below 69 kPa, more preferably below 50 kPa.

In a preferred embodiment, the steaming treatment of the catalyst is carried out inside the reactor without unloading the molecular sieve catalyst. In an alternative embodiment, the steaming procedure is carried out outside the reactor after unloading the molecular sieve catalyst.

In one embodiment, the steaming treatment of the catalyst is carried out by flowing steam from the top of the reactor to the bottom of the reaction ("top-down" procedure) following by flowing steam from the bottom of the reactor to the top of the reactor ("bottom-up" procedure). The top-down steaming followed by the bottom-up steaming procedure ("top-down-bottom-up" procedure) reduces the time required to strip adsorbed hydrocarbons from the pretreatment catalyst. In another embodiment, the steaming treatment of the catalyst may be carried out by the bottom-up procedure followed by the top-down ("bottom-up-top-down" procedure) procedure. In yet another embodiment, the steaming treatment of the catalyst comprises any combination of the top-down procedure(s) and the bottom-up procedure(s).

In one embodiment, the catalyst after stripping with steam has less than 50 wt. %, preferably less than 80 wt. %, more preferably less than 90 wt. %, and most preferably less than 95 wt. % of the hydrocarbons on the catalyst before stripping with steam. In another embodiment, the catalyst after stripping with steam followed by regeneration has more than 50%, preferably more than 80%, more preferably more than 90%, and most preferably more than 95% of the catalytic activity (e.g., alpha value, or cycle-length) of the fresh catalyst for BI reduction.

After steaming, the catalyst may be further subject to rejuvenation, regeneration, or any combination thereof. The rejuvenation may be carried out with an inert or reductive agent, e.g., $N_2$, He, $H_2$, or any combination thereof, under conditions comprising a temperature range of about 30 to 900° C., a pressure range of about 10 to 20000 kpa-a, and a WHSV from about 0.1 hr$^{-1}$ to about 1000 hr$^{-1}$. The regeneration may be carried out with an oxidative agent, e.g., oxygen, air, or any combination thereof, under conditions comprising a temperature range of about 30 to 900° C., a pressure range of about 10 to 20000 kpa-a, and a WHSV from about 0.1 hr$^{-1}$ to about 1000 hr$^{-1}$.

In another embodiment, this invention relates to a process to steam stripping a catalyst including a clay and a molecular sieve having a structure type of MWW under steaming conditions. The catalyst after steam stripping may be further subjected to regeneration. The catalyst after steam stripping and regeneration has more than 50%, preferably more than 80%, more preferably more than 90%, and most preferably more than 95% of the cycle-length of the fresh catalyst for BI reduction.

In yet another embodiment, this invention relates to a process to steam stripping a catalyst after such catalyst being used in the BI reduction for a period of time. In this situation, the catalyst may contain some hydrocarbons deposited during the BI reduction process. In one embodiment, this invention relates to a process to steam stripping a catalyst after such catalyst without being used in the BI reduction. In this situation, the catalyst may have been used in other processes (other than BI reduction, such as alkylation of benzene with olefins).

In one embodiment, this invention relates to a process for retrofitting an existing clay catalyst reactor ("clay treater") with a catalyst steamed and regenerated/rejuvenated according to this invention. In a preferred embodiment, this invention relates to a process replacing at least a portion of existing clay catalyst in an existing clay catalyst reactor with a catalyst steamed and regenerated/rejuvenated according to this invention. The preferred embodiment abovementioned may further comprise a step of adding a catalyst steamed and regenerated/rejuvenated according to this invention to the existing clay treater. In a preferred embodiment, this invention relates to a process replacing at least 10 wt. %, preferably 25 wt. %, more preferably 40 wt. %, most preferably at least 50 wt. %, existing clay catalyst in an existing clay catalyst reactor with a catalyst steamed and regenerated/rejuvenated according to this invention. In yet another preferred embodiment, this invention relates to a process replacing entire clay catalyst in the existing clay treater with a catalyst steamed and regenerated/rejuvenated according to this invention.

The following examples illustrate exemplary preferred embodiments:

Two hydrocarbon feedstock used in the following examples were analyzed using standard gas chromatograph ("GC") analysis and the ASTM BI test (BI). The compositions of this feedstock is listed in Table 1.

TABLE 1

| Hydrocarbon Feedstock | |
| --- | --- |
| BI | 570-1200 |
| Total olefinic compounds (wppm) | 5200-8400 |
| Total aromatics (wt. %) | Greater than 99 |
| Others (wt. %) | Less than 1 |

EXAMPLE 1

A pilot test unit was loaded with a fresh MCM-22 catalyst ($Si/Al_2$=25, particle size about 1 mm) having an alpha value of 100 and used to process a feed (table 1) with a BI of near 600. The unit was operated at 100 $hr^{-1}$ WHSV, 210° C., and 1480 kpa-a. The BI of the product at the start of the test was 10. After 10.4 days on stream the product BI exceeded 50 and the test was ended.

EXAMPLE 2

The catalyst of example 1 was steamed at 515 kpa-a and 200° C. for 7 days. The alpha value for steamed catalyst was 33. The catalyst was unloaded, regenerated at 550° C., 101 kPa-a, 10 $hr^{-1}$ WHSV with air, and reloaded into the pilot unit. The alpha value for the steamed and regenerated catalyst was 30. The regenerated catalyst was tested at identical conditions to the example 1. After 7.2 days on stream the product BI exceeded 50 and the test was ended.

The steamed and regenerated catalyst had only about $\frac{1}{3}^{rd}$ of the activity for hexane cracking as the fresh catalyst. The steamed and regenerated catalyst had short cycle-length (7.2 days) than the fresh MCM-22 catalyst (10.4 days).

EXAMPLE 3

A reactor was loaded with 50 vol. % fresh MCM-22 catalyst (same as example 1) and 50 vol. % F-24 clay catalyst. The reactor was operated at 200° C., 1 $hr^{-1}$ WHSV, and 1480 kpa-a. During the test the operating temperature was raised to 205° C. After 170 days on stream the product BI exceeded 50 and the test was ended. The catalyst was steamed from top to the bottom of the bed at 136 kPa-a outlet pressure and 210° C. The steam flowrate was adjusted to keep the pressure drop across the bed at less than 69 kPa. The catalyst was steamed for 18 hrs. The catalyst was then steamed at the identical conditions except the steam flowed from the bottom to the top of the catalyst bed. After 18 hrs the steaming was stopped. Steam flow was replaced by flowing nitrogen with a pressure drop of 7 kPa. Nitrogen flow was maintained while the reactor was cooled to 50° C. When the reactor reached 50° C. the inlet and outlet valves were shut in order to block in the reactor. When the reactor cooled to less than 40° C., the reactor was opened and the catalyst was removed. The alpha value for steamed catalyst was 100. The steamed catalyst was regenerated at 550° C., 101 kpa-a, 10 $hr^{-1}$ WHSV with air. The alpha value for steamed and regenerated catalyst was 100. The reactor was reloaded with 50 vol. % F-24 catalyst and 45 vol. % steamed and regenerated MCM-22 catalyst, and 5 vol. % of the fresh MCM-22 catalyst. The reactor was again operated at 200° C., 1 $hr^{-1}$ WHSV. During the test the temperature again was raised to 205° C. After 173 days on stream the product BI exceeded 50 and the test was ended.

The performance of the fresh and regenerated MCM-22 catalyst was identical within experimental error. The inventors believe that the different steaming conditions are responsible for the greatly improved regeneration observed in example 3 vs. examples 1 and 2.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

We claim:

1. A process for stripping hydrocarbons from a catalyst, comprising clay and MCM-22, comprising the step of:
   (a) contacting said catalyst with steam at stripping conditions,
   wherein said catalyst comprises a molecular sieve having a structure type of MWW, said steam comprises at least 90 wt. % vapor phase $H_2O$, said stripping conditions comprise a temperature range from about 100° C. to about 250° C., a pressure less than 310 kPa-a, and a WHSV range from about 0.01 to about 100 $hr^{-1}$.

2. The process according to claim 1, wherein said temperature range is from about 150° C. to about 250° C.

3. The process according to claim 1, wherein said temperature range is from about 200° C. to about 250° C.

4. The process according to claim 1, wherein said stripping conditions are sufficient to reduce at least 95 wt. % of the hydrocarbons from said catalyst.

5. The process according to claim 1, further comprising a step of regenerating said catalyst with an oxidative agent under regeneration conditions having a temperature range of about 30 to 900° C., a pressure range of about 10 to 20000 kpa-a, and a WHSV from about 0.1 $hr^{-1}$ to about 1000 $hr^{-1}$.

6. The process according to claim 5, wherein the regenerated catalyst has at least 80% of the cycle-length of the fresh catalyst.

7. The process according to claim 1, further comprising a step of rejuvenating said catalyst with a reductive agent under rejuvenation conditions having a temperature range of about 30 to 900° C., a pressure range of about 10 to 20000 kPa-a, and a WHSV from about 0.1 $hr^{-1}$ to about 1000 $hr^{-1}$.

8. The process according to claim 1, wherein said step (a) comprises:
   (i) flowing said steam from the top to the bottom of the catalyst; and
   (ii) flowing said steam from the bottom to the top of the catalyst.

9. The process according to claim 8, wherein said step (i) is performed before step (ii).

* * * * *